US011556507B2

(12) United States Patent
Li et al.

(10) Patent No.: US 11,556,507 B2
(45) Date of Patent: Jan. 17, 2023

(54) PROCESSING METRICS DATA WITH GRAPH DATA CONTEXT ANALYSIS

(71) Applicant: International Business Machines Corporation, Armonk, NY (US)

(72) Inventors: Shao Rong Il Li, Beijing (CN); Cheng Luo, Beijing (CN); Lan Cao, Beijing (CN); Cheng Cheng Dong, Beijing (CN)

(73) Assignee: International Business Machines Corporation, Armonk, NY (US)

(*) Notice: Subject to any disclaimer, the term of this patent is extended or adjusted under 35 U.S.C. 154(b) by 592 days.

(21) Appl. No.: 16/601,310

(22) Filed: Oct. 14, 2019

(65) Prior Publication Data

US 2021/0109905 A1 Apr. 15, 2021

(51) Int. Cl.
*G06F 16/00* (2019.01)
*G06F 16/21* (2019.01)
*G06F 16/901* (2019.01)
*G06F 16/182* (2019.01)
*G06F 16/22* (2019.01)

(52) U.S. Cl.
CPC ......... *G06F 16/212* (2019.01); *G06F 16/182* (2019.01); *G06F 16/2228* (2019.01); *G06F 16/9024* (2019.01)

(58) Field of Classification Search
CPC .. G06F 16/212; G06F 16/182; G06F 16/2228; G06F 16/9024; G06N 5/02
See application file for complete search history.

(56) References Cited

U.S. PATENT DOCUMENTS

| | | | |
|---|---|---|---|
| 10,198,159 B2 | 2/2019 | Ziegler et al. | |
| 10,223,398 B2* | 3/2019 | Qin | G06F 16/248 |
| 2013/0232452 A1 | 9/2013 | Krajee et al. | |
| 2014/0254433 A1* | 9/2014 | Abe | H04L 41/12 |
| | | | 370/256 |
| 2018/0025035 A1* | 1/2018 | Xia | G06F 16/2219 |
| | | | 707/600 |
| 2018/0191867 A1 | 7/2018 | Siebel et al. | |

(Continued)

OTHER PUBLICATIONS

Simmen et al., "Large-Scale Graph Analytics in Aster 6: Bringing Context to Big Data Discovery". Proceedings of the VLDB Endowment VLDB Endowment Hompage archive, vol. 7 Issue 13, Aug. 2014, pp. 1405-1416.

(Continued)

*Primary Examiner* — Alexander Khong
(74) *Attorney, Agent, or Firm* — Daniel J. Blabolil (57) ABSTRACT

A method, system and computer program product for processing metrics data with graph data context analysis. Graph data representing one or more devices or sensors is stored into a first database, and metrics data generated by the devices or sensors is stored in a second database. The metrics data is then applied to the graph data for the context analysis, wherein the context analysis reflects the relationships of the devices or sensors in the graph data to the metrics data generated by the devices or sensors. The graph data comprises nodes for representing the devices or sensors, edges for representing a topology of the devices or sensors, and properties for storing the metrics data associated with the nodes and edges; and the metrics data comprises time-series data that is logged by the devices and sensors.

15 Claims, 5 Drawing Sheets

(56) References Cited

U.S. PATENT DOCUMENTS

| | | |
|---|---|---|
| 2019/0034489 A1 | 1/2019 | Ziegler |
| 2019/0114244 A1* | 4/2019 | Salunke .................. G06F 11/34 |
| 2020/0159691 A1* | 5/2020 | Swaminathan ..... G06F 15/7867 |
| 2021/0004742 A1* | 1/2021 | Shi ........................ G06K 9/6293 |
| 2021/0011890 A1* | 1/2021 | Mdini ................. H04L 41/0631 |

OTHER PUBLICATIONS

Jirkovsky et al., "Big Data Analysis for Sensor Time-Series in Automation". 2014 IEEE Emerging Technology and Factory Automation (ETFA), 8 pages.

\* cited by examiner

PROCESSING METRICS DATA WITH GRAPH DATA CONTEXT ANALYSIS

BACKGROUND

The present invention relates generally to processing metrics data with graph data context analysis.

For many processes, such as industrial and commercial processes, there is a need to actively consume metrics data logged from the processes to generate various reports, with a knowledge of the relationship among devices or sensors generating the metrics data.

One traditional way is to use database tables to identify the devices or sensors, as well as the relationships between the devices and sensors, and to log the metrics data generated by the devices or sensors. However, it is hard to maintain the complexity of relationships between the devices and sensors in the database tables, and there is often a high redundancy rate for the metrics data the database tables.

Moreover, there are problems when attempting to combine the two kinds of data for reporting purposes. Specifically, there are problems in many scenarios when attempting to produce meaningful results from both kinds of data. Often, results are produced from each kind of data separately, and an end-user must consider these results separately.

There is a need in the art, then, for systems and methods for processing such data in order to produce meaningful results. The present invention satisfies this need.

SUMMARY

The invention provided herein has many embodiments useful, for example, in implementing a method, system and computer program product for processing metrics data with graph data context analysis, by: storing the graph data representing one or more devices or sensors into a first database; storing the metrics data generated by the devices or sensors into a second database; and applying the metrics data to the graph data for the context analysis, wherein the context analysis reflects the relationships of the devices or sensors in the graph data to the metrics data generated by the devices or sensors.

The graph data reflects relationships between the devices or sensors, wherein the graph data comprises nodes for representing the devices or sensors, edges for representing a topology of the devices or sensors, and properties for storing the metrics data associated with the nodes and edges. The metrics data comprises time-series data.

The processing step further comprises providing a universal programming model for interacting with both the first and second databases storing the graph data and the metrics data, wherein the universal programming model provides for both traversal of the graph data and operations on the metrics data. The universal programming model comprises one or more code templates that include at least one selection of one or more of the devices or sensors that are represented by the graph data, one or more filter conditions that select the metrics data, and at least one function to apply the metrics data to the graph data. Specifically, the processing comprises selecting one or more of the devices or sensors from the graph data; filtering the metrics data using the selected one or more of the devices or sensors; generating a subgraph of the selected one or more of the devices or sensors; and applying the filtered metrics data to the subgraph for the context analysis. In addition, the processing step further comprises traversing the subgraph and performing one or more calculations on the applied metrics data.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized, and structural and functional changes may be made without departing from the scope of the present invention.

Overview

The present invention provides an efficient way of processing metrics data with graph data context analysis. Graph data representing one or more devices or sensors is stored into a first database, and metrics data generated by the devices or sensors is stored in a second database. The metrics data is then applied to the graph data for the context analysis, wherein the context analysis reflects the relationships of the devices or sensors in the graph data to the metrics data generated by the devices or sensors.

In one embodiment, the graph data comprises nodes for representing the devices or sensors, edges for representing a topology of the devices or sensors, and properties for storing the metrics data associated with the nodes and edges; and the metrics data comprises time-series data that is logged by the devices and sensors.

The present invention provides an efficient way of processing both the metrics data and the graph data. Moreover, both the metrics data and the graph data provide their own specific capabilities for queries and calculations. The present invention can utilize these two kinds of data in a unified manner while providing improved performance.

Specifically, this invention includes the following features:

1. A system and method to consume graph data and metrics data together while maintaining them on different types of databases.

2. The graph data is generated from inter-relationship data extracted from a relational or traditional database for example, IBM DB2®, which supports the relational model, and has been extended to support object-relational features and non-relational structures.

3. The metrics data is accessed from a distributed file system (DFS), for example, IBM Cloudant®, which is a distributed database that stores data across a plurality of computing nodes, providing very high aggregate bandwidth across the computing nodes, and is optimized for handling heavy workloads that are typical of large, fast-growing databases.

4. The system and method provides a universal programming model for interacting with both the first and second databases storing the graph data and the metrics data, wherein the universal programming model comprises an improved version of Map-Reduce™ programming for both traversal of the graph data and operations on the metrics data. In Map-Reduce programming, an application is divided into one or more Map tasks that perform filtering and sorting, and/or one or more Reduce tasks that perform summary operations. Map-Reduce programming is well known for supporting graph traversal (for example, Gremlin™) and time-series operations (for example, Spark™). Moreover, Map-Reduce programming is well known for its ability to orchestrate executions of tasks in a pipeline and/or in parallel, while handling any dependencies (for example, Hadoop™). Finally, Map-Reduce programming is well known for simplifying the query language while expressing complex tasks.

5. The universal programming model is standardized to allow reuse and comprises one or more code templates that include at least one selection of one or more of the devices or sensors that are represented by the graph data, one or more filter conditions that select the metrics data, and at least one function to apply the metrics data to the graph data. Using the code templates, the step or function of applying the metrics data to the graph data for the context analysis comprises selecting one or more of the devices or sensors from the graph data; filtering the metrics data using the selected one or more of the devices or sensors; generating a subgraph of the selected one or more of the devices or sensors; and applying the filtered metrics data to the subgraph for the context analysis. Thereafter, the processing may further comprise traversing the subgraph and performing one or more calculations on the applied metrics data.

Technical Description

Figure 1:
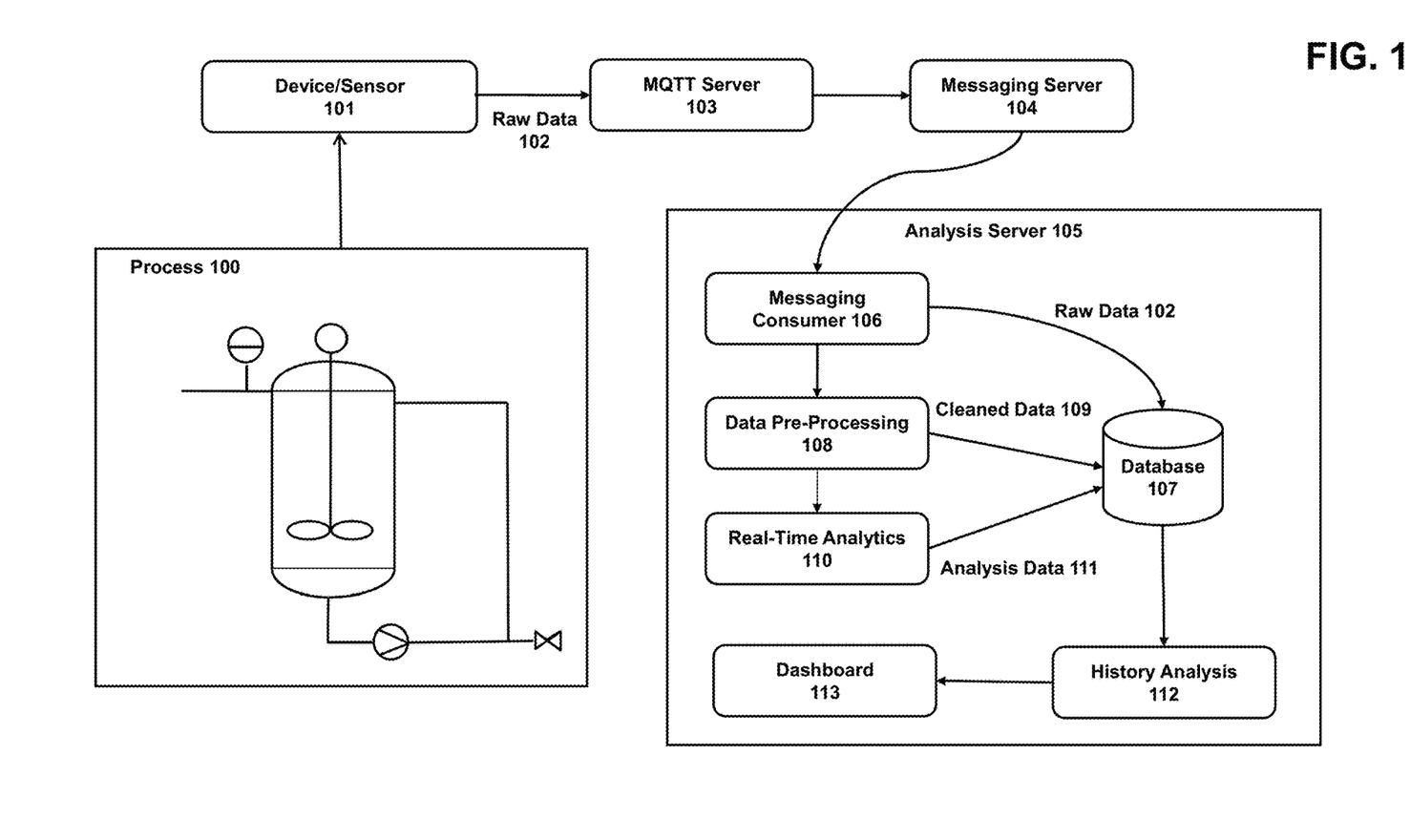
FIG. 1 is a schematic illustrating a typical data collection scenario, according to one embodiment.

FIG. 1 is a schematic illustrating a typical data collection scenario, according to one embodiment. In this example, a Process 100 is monitored by one or more Devices or Sensors 101, which generate Raw Data 102 comprising metrics data, such as time-series data, reflecting the status of the Process 100. The Devices or Sensors 101 communicate the Raw Data 102 to a Message Queuing Telemetry Transport (MQTT) Server 103 using a publish-subscribe-based messaging protocol. The MQTT Server 103 forwards the Raw Data 102 to a Messaging Server 104, which feeds the Raw Data 102 to one or more Analysis Servers 105.

The Analysis Servers 105 includes one or more of the Messaging Consumers 106, which may store the Raw Data 102 into one or more Databases 107. Others of the Messaging Consumers 106 may provide the Raw Data 102 for Data Pre-Processing 108, for example, to generate Cleaned Data 109, which may be stored in the Databases 107. The Cleaned Data 109 may be provided to a Real-time Analytics 110 to generate Analysis Data 111, which may be stored in the Databases 107. The Raw Data 102, Cleaned Data 109 and/or Analysis Data 111 may be retrieved from the Databases 107 for History Analysis 112, the results of which may be presented to an end-user on a Dashboard 113.

Figure 2:
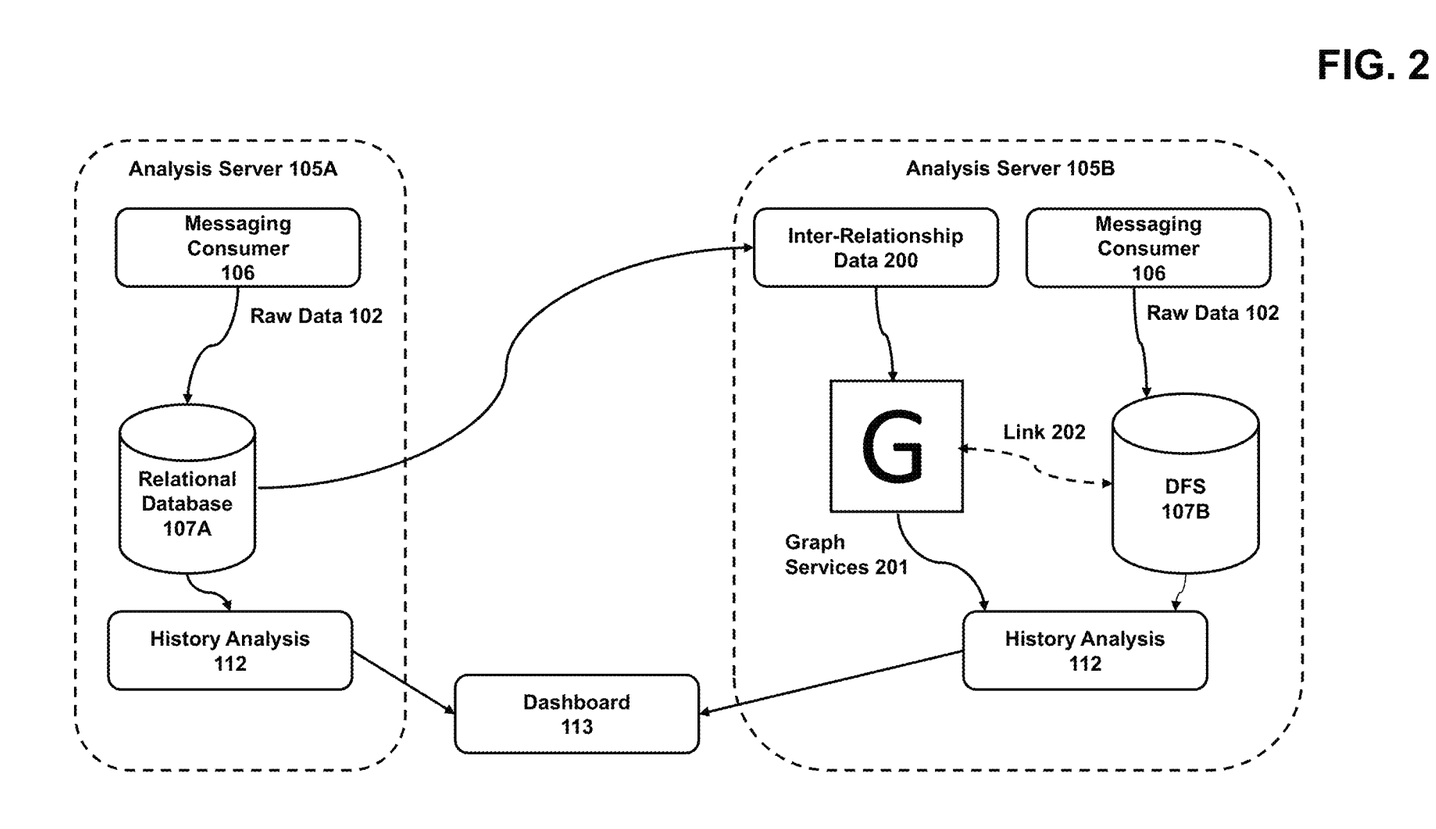
FIG. 2 is a schematic illustrating a typical data analysis scenario, according to one embodiment.

FIG. 2 is a schematic illustrating a typical data analysis scenario, according to one embodiment. In this example, an Analysis Server 105A includes a Messaging Consumer 106 that stores attributes of the Raw Data 102 into a first database comprising a Relational Database 107A, wherein these attributes comprise graph data representing one or more of the Devices or Sensors 101 that reflects the relationships between the Devices or Sensors 101. Also in this example, an Analysis Server 105B includes a Messaging Consumer 106 that stores attributes of the Raw Data 102 into a second database comprising a Distributed File System (DFS) 107B, wherein these attributes comprise metrics data, such as time-series data, generated by the Devices or Sensors 101.

The attributes stored in the Relational Database 107A are used to create Inter-Relationship Data 200 describing the Devices or Sensors 101 and the relationships between the Devices or Sensors 101. The Inter-Relationship Data 200 is accessed by Graph Services 201 to generate graph data representing a topology of the Devices or Sensors 101, wherein the graph data comprises nodes for representing the Devices or Sensors 101, edges for representing a topology of the Devices or Sensors 101, and properties for storing the metrics data associated with the nodes and edges. Moreover, the graph data is linked 202 with the metrics data stored in the Distributed File System 107B through attributes identifying the Devices or Sensors 101 and the relationships between the Devices or Sensors 101.

Both the graph data and the metrics data are retrieved for History Analysis 112, namely, applying the metrics data to the graph data for the context analysis, wherein the context analysis reflects the relationships of the Devices or Sensors 101 in the graph data to the metrics data generated by the Devices or Sensors 101, and the results may be presented to an end-user on the Dashboard 113. Similarly, the attributes identifying the Devices or Sensors 101 and the relationships between the Devices or Sensors 101 may be retrieved from the Relational Database 107A for History Analysis 112, the results of which may also be presented to an end-user on the Dashboard 113.

Figure 3:
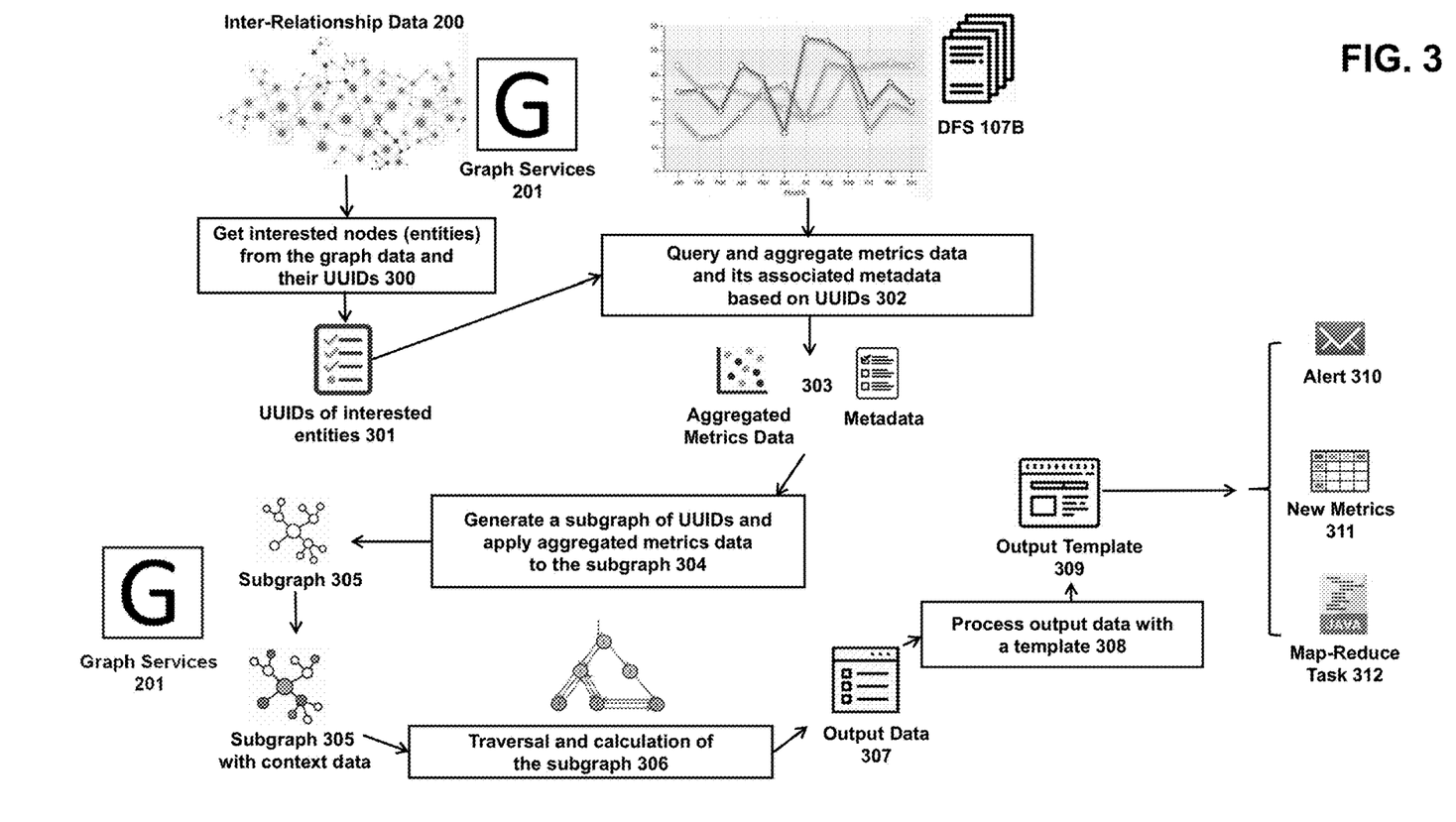
FIG. 3 illustrates an exemplary flow or pipeline of a user problem (performed either in sequence or in parallel) combining both the graph data and metrics data, according to one embodiment.

FIG. 3 illustrates an exemplary flow or pipeline of a user problem (performed either in sequence or in parallel) combining both the graph data and metrics data, according to one embodiment. This flow or pipeline provides a universal programming model for interacting with both the first and second databases 107A, 107B storing the graph data and the metrics data, wherein the universal programming model provides for both traversal of the graph data and operations on the metrics data. Specifically, the universal programming model comprises one or more code templates that include at least one selection of one or more of the Devices or Sensors 101 that are represented by the graph data, one or more filter conditions that select the metrics data, and at least one function to apply the metrics data to the graph data.

Block 300 represents the system obtaining interested nodes (entities) from graph data represented by the Inter-Relationship Data 200, and then generating a list of universally unique identifiers (UUIDs) 301 of the interested entities. This step comprises selecting one or more of the Devices or Sensors 101 from the graph data using a graph language or script, for example, to generate the list of UUIDs 301 of the interested entities.

Block 302 represents the system querying and aggregating metrics data 303 from the Distributed File System 107B that is filtered based on the list of UUIDs 301, wherein the data 303 comprises time-series data and its associated metadata. This step comprises filtering the metrics data using the selected one or more of the Devices or Sensors 101. For example, the list of UUIDs 301 may be used to filter the Distributed File System 107B based on the interested entities, which will make the metrics data 303 context sensitive.

Block 304 represents the system generating a subgraph 305 of the selected one or more of the Devices or Sensors 101 using the list of UUIDs 301, wherein the subgraph 305 is generated by the Graph Services 201, and then applying the filtered metrics data 303 to the subgraph 305 for the context analysis.

Block 306 represents the system traversing the subgraph 305 and performing one or more calculations on the applied metrics data of the subgraph 305, to generate output data 307. The output data 307 may be a unified format representing subgraph 305 relationships and properties.

Block 308 represents the system processing the output data 307 using one or more output templates 309, wherein the output templates 309 define the output data 307 in terms or formats that can then be used to generate alerts 310 or new metrics 311, or that can be used as input to a one or more Map-Reduce tasks 312, wherein the output from the Map-Reduce tasks 312 could be stored in the Distributed File System 107B as time-series data for additional processing, for example, by the same pipeline, or by an analytics engine, such as Spark™

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
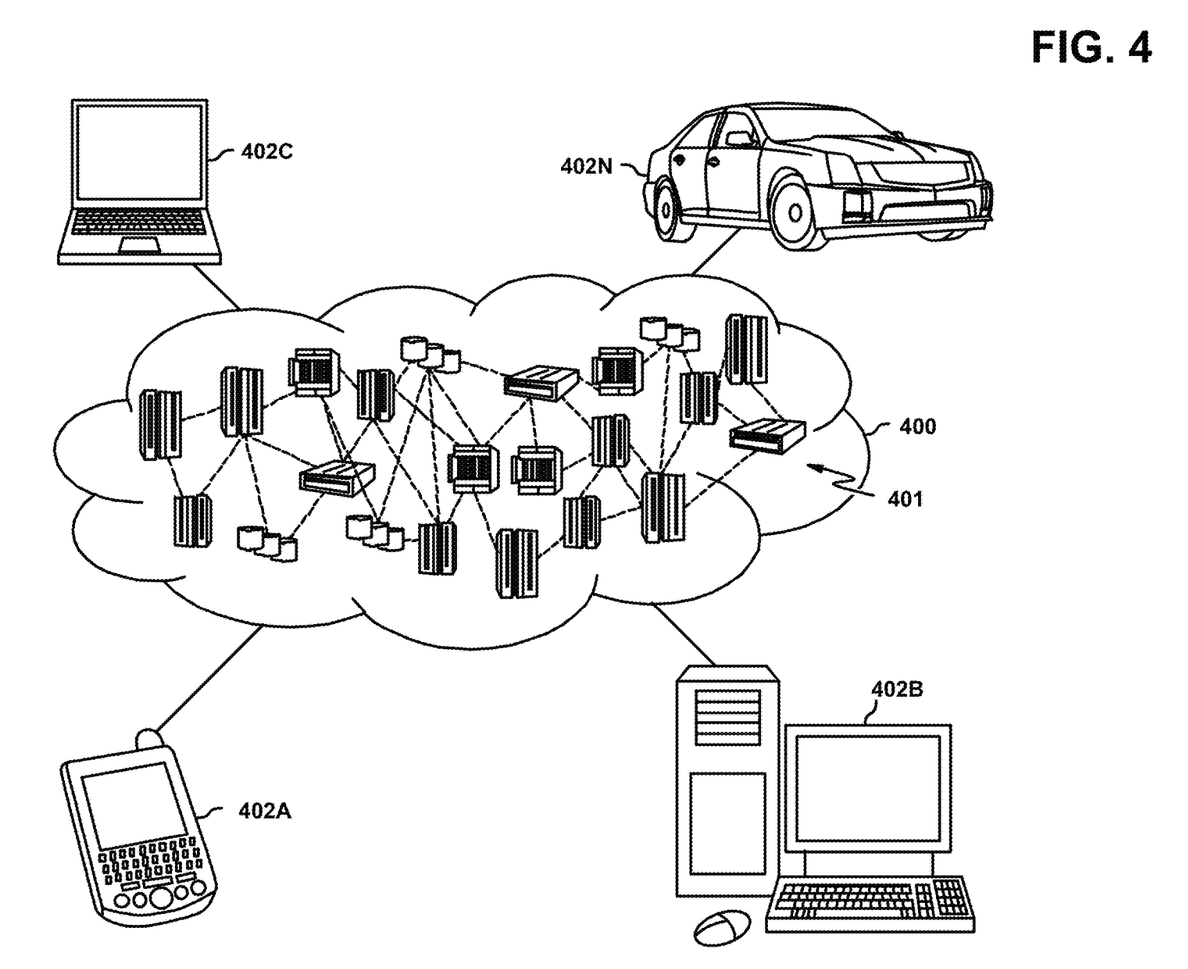
FIG. 4 depicts an illustrative cloud computing environment.

Referring to FIG. 4, illustrative cloud computing environment 400 is depicted. As shown, cloud computing environment 400 includes one or more cloud computing nodes 401 with which local computing devices used by cloud consumers, such as, for example, personal digital assistant (PDA) or cellular telephone 402A, desktop computer 402B, laptop computer 402C, and/or automobile computer system 402N may communicate. Nodes 401 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 402A-N shown in FIG. 4 are intended to be illustrative only and that computing nodes 401 and cloud computing environment 400 can communicate with any type of computerized device over any type of network and/or network addressable connection (e.g., using a web browser).

Figure 5:
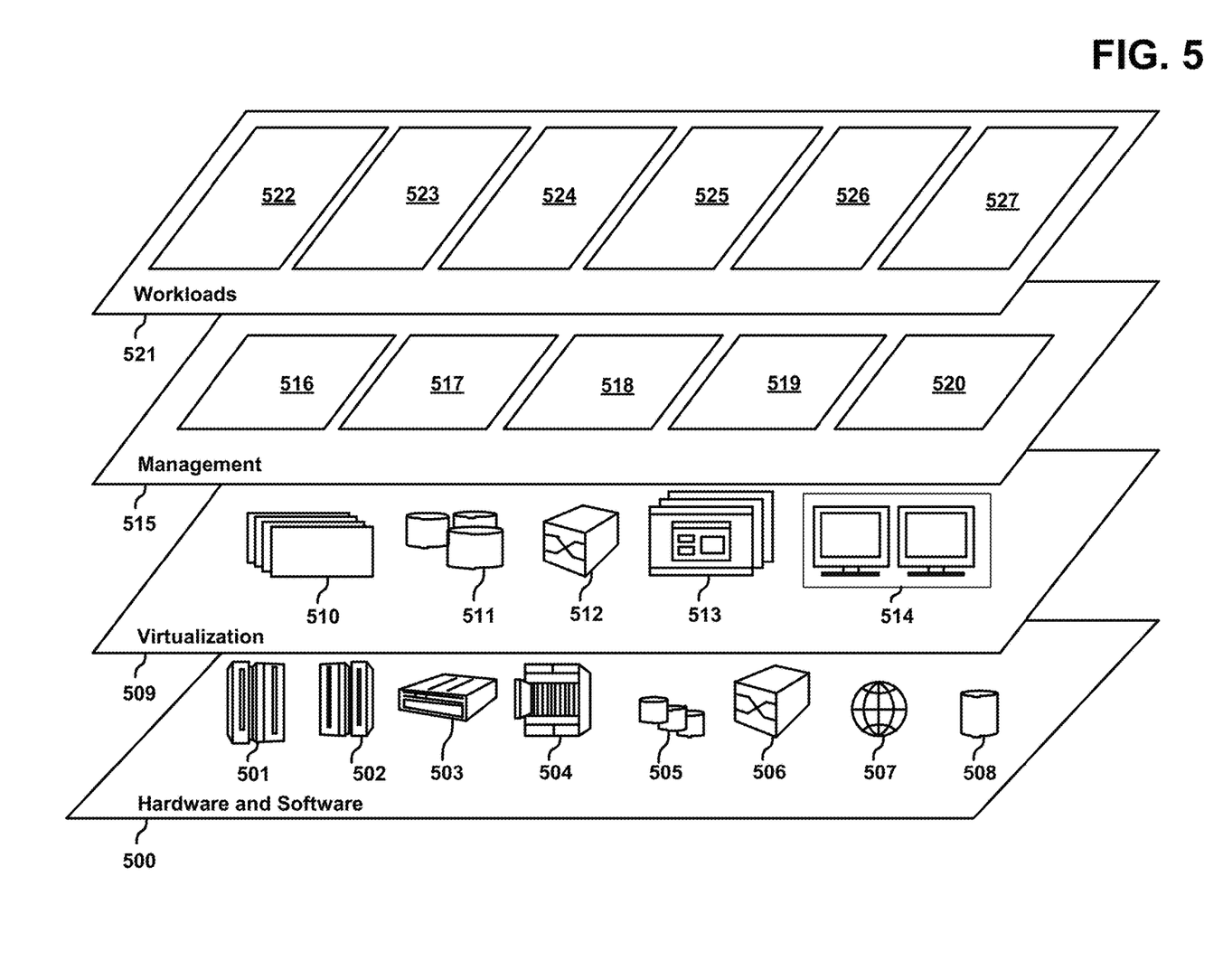
FIG. 5 shows a set of functional abstraction layers provided by the cloud computing environment.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 500 includes hardware and software components. Examples of hardware components include: one or more computers such as mainframes 501, RISC (Reduced Instruction Set Computer) architecture based servers 502, servers 503, and blade servers 504; storage devices 505; and networks and networking components 506. In some embodiments, software components include network application server software 507 and database software 508.

Virtualization layer 509 provides an abstraction layer from which the following examples of virtual entities may be provided: virtual servers 510; virtual storage 511; virtual networks 512, including virtual private networks; virtual applications and operating systems 513; and virtual clients 514.

In one example, management layer 515 may provide the functions described above. Resource provisioning 516 provides dynamic procurement of computing resources and other resources that are utilized to perform tasks within the cloud computing environment 400. Metering and pricing 517 provide cost tracking as resources are utilized within the cloud computing environment 400, and billing or invoicing for consumption of these resources. In one example, these resources may include application software licenses. Security provides identity verification for cloud consumers and tasks, as well as protection for data and other resources. User portal 518 provides access to the cloud computing environment 400 for consumers and system administrators. Service level management 519, which includes containers, provides cloud computing resource allocation and management such that required service levels are met. Service Level Agreement (SLA) planning and fulfillment 520 provide pre-arrangement for, and procurement of, cloud computing resources for which a future requirement is anticipated in accordance with an SLA.

Workloads layer 521 provides examples of functionality for which the cloud computing environment 400 may be utilized. Examples of workloads, tasks and functions which may be provided from this layer include: mapping and navigation 522; software development and lifecycle management 523; virtual classroom education delivery 524; data analytics processing 525; transaction processing 526; etc. More specifically, this layer includes the workloads, tasks and functions 527 for processing metrics data with graph data context analysis, as described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented method, comprising:
processing metrics data with graph data context analysis using one or more programmed computers, by:
storing the graph data representing one or more devices or sensors into a first database;
storing the metrics data generated by the devices or sensors into a second database; and
applying the metrics data to the graph data for the context analysis, wherein the context analysis reflects the relationships of the devices or sensors in the graph data to the metrics data generated by the devices or sensors, wherein the applying comprises selecting one or more of the devices or sensors from the graph data, filtering the metrics data using the selected one or more of the devices or sensors, generating a subgraph of the selected one or more of the devices or sensors, applying the filtered metrics data to the subgraph for the context analysis, traversing the subgraph, and performing one or more calculations on the applied metrics data, wherein the one or more calculations generate output data representing subgraph relationships and properties.

2. The method of claim 1, wherein the graph data reflects relationships between the devices or sensors.

3. The method of claim 1, wherein the graph data comprises nodes for representing the devices or sensors, edges for representing a topology of the devices or sensors, and properties for storing the metrics data associated with the nodes and edges.

4. The method of claim 1, wherein the metrics data comprises time-series data.

5. The method of claim 1, wherein the processing further comprises providing a universal programming model for interacting with both the first and second databases storing the graph data and the metrics data, wherein the universal programming model provides for both traversal of the graph data and operations on the metrics data.

6. The method of claim 5, wherein the universal programming model comprises one or more code templates that include at least one selection of one or more of the devices or sensors that are represented by the graph data, one or more filter conditions that select the metrics data, and at least one function to apply the metrics data to the graph data.

7. A computer-implemented system, comprising:
one or more computers programmed for processing metrics data with graph data context analysis, by:
storing the graph data representing one or more devices or sensors into a first database;
storing the metrics data generated by the devices or sensors into a second database; and
applying the metrics data to the graph data for the context analysis wherein the applying comprises selecting one or more of the devices or sensors from the graph data, filtering the metrics data using the selected one or more of the devices or sensors, generating a subgraph of the selected one or more of the devices or sensors, applying the filtered metrics data to the subgraph for the context analysis, traversing the subgraph, and performing one or more calculations on the applied metrics data, wherein the one or more calculations generate output data representing subgraph relationships and properties.

8. The system of claim 7, wherein the graph data reflects relationships between the devices or sensors.

9. The system of claim 7, wherein the graph data comprises nodes for representing the devices or sensors, edges for representing a topology of the devices or sensors, and properties for storing the metrics data associated with the nodes and edges.

10. The system of claim 7, wherein the metrics data comprises time-series data.

11. The system of claim 7, wherein the processing further comprises providing a universal programming model for interacting with both the first and second databases storing the graph data and the metrics data, wherein the universal programming model provides for both traversal of the graph data and operations on the metrics data.

12. The system of claim 11, wherein the universal programming model comprises one or more code templates that include at least one selection of one or more of the devices or sensors that are represented by the graph data, one or more filter conditions that select the metrics data, and at least one function to apply the metrics data to the graph data.

13. A computer program product, the computer program product comprising a computer readable storage medium having program instructions embodied therewith, the program instructions executable by one or more computers to cause the computers to perform a method, comprising:

processing metrics data with graph data context analysis, by:

storing the graph data representing one or more devices or sensors into a first database;

storing the metrics data generated by the devices or sensors into a second database; and applying the metrics data to the graph data for the context analysis wherein the applying comprises selecting one or more of the devices or sensors from the graph data, filtering the metrics data using the selected one or more of the devices or sensors, generating a subgraph of the selected one or more of the devices or sensors, applying the filtered metrics data to the subgraph for the context analysis, traversing the subgraph, and performing one or more calculations on the applied metrics data, wherein the one or more calculations generate output data representing subgraph relationships and properties.

14. The computer program product of claim 13, wherein the graph data reflects relationships between the devices or sensors, and the metrics data comprises time-series data.

15. The computer program product of claim 13, wherein the processing further comprises providing a universal programming model for interacting with both the first and second databases storing the graph data and the metrics data, and the universal programming model comprises one or more code templates that include at least one selection of one or more of the devices or sensors that are represented by the graph data, one or more filter conditions that select the metrics data, and at least one function to apply the metrics data to the graph data.

* * * * *